US012630324B2

(12) United States Patent
Hu et al.

(10) Patent No.: US 12,630,324 B2
(45) Date of Patent: May 19, 2026

(54) CHARACTER-PRINTING VACUUM SEALER AND SEALING METHOD USING THIS CHARACTER-PRINTING VACUUM SEALER

(71) Applicant: Ningbo Kedly Appliance Industry Co., Ltd., Ningbo (CN)

(72) Inventors: Zhihe Hu, Ningbo (CN); Zefeng Li, Ningbo (CN); Rongtao Tao, Ningbo (CN)

(73) Assignee: Ningbo Kedly Appliance Industry Co., Ltd. (CN)

( * ) Notice: Subject to any disclaimer, the term of this patent is extended or adjusted under 35 U.S.C. 154(b) by 0 days.

(21) Appl. No.: 19/218,518

(22) Filed: May 26, 2025

(65) Prior Publication Data

US 2026/0109505 A1 Apr. 23, 2026

(30) Foreign Application Priority Data

Oct. 18, 2024 (CN) ......................... 202411457149.2

(51) Int. Cl.
*B41K 3/06* (2006.01)
*B41K 3/02* (2006.01)
*B65B 31/04* (2006.01)
*B65B 61/26* (2006.01)

(52) U.S. Cl.
CPC ................ *B65B 61/26* (2013.01); *B41K 3/02* (2013.01); *B65B 31/048* (2013.01)

(58) Field of Classification Search
None
See application file for complete search history.

(56) References Cited

U.S. PATENT DOCUMENTS

| | | | | |
|---|---|---|---|---|
| 4,023,485 | A * | 5/1977 | Kirby, Jr. | B41K 3/06 101/108 |
| 4,337,698 | A * | 7/1982 | Jenkins | B41K 3/06 101/105 |
| 4,502,383 | A * | 3/1985 | Okabe | B41K 3/06 101/382.1 |
| 4,584,938 | A * | 4/1986 | Karn | B41K 1/10 101/105 |
| 6,080,259 | A | 6/2000 | Nadeau et al. | |
| 2020/0299013 | A1* | 9/2020 | Ye | B29C 66/81821 |
| 2021/0179306 | A1 | 6/2021 | Zhou | |

FOREIGN PATENT DOCUMENTS

| | | | |
|---|---|---|---|
| CN | 211055476 | U * | 7/2020 |
| WO | 2020108585 | A1 | 6/2020 |

* cited by examiner

*Primary Examiner* — Tanzim Imam
(74) *Attorney, Agent, or Firm* — Emerson, Thomson & Bennett, LLC; Roger D. Emerson; Peter R. Detorre

(57) ABSTRACT

Provided is a character-printing vacuum sealer comprising a base and a cover, the cover being movably hinged to a rear edge of the base, the base being configured with a vacuum pump a control circuit board, and a power cord, wherein the vacuum pump is electrically connected to the control circuit board; an upper vacuum chamber and a lower vacuum chamber, wherein the upper vacuum chamber corresponding to the lower vacuum chamber forms a heat-seal area when the cover is closed against the base, wherein the upper and lower vacuum chambers are each configured with a sealing gasket at their peripheries; a heating sheet assembly electrically connected to the control circuit board being positioned on a front edge of the base opposite to the rear edge; a heat-seal strip being positioned on a front edge of the cover opposite to the rear edge.

9 Claims, 5 Drawing Sheets

CHARACTER-PRINTING VACUUM SEALER AND SEALING METHOD USING THIS CHARACTER-PRINTING VACUUM SEALER

CROSS-REFERENCE TO RELATED APPLICATIONS

This application claims priority to Chinese Application NO. 202411457149.2, having a filing date of Oct. 18, 2024, the entire contents of which are hereby incorporated by reference.

TECHNICAL FIELD OF TECHNOLOGY

The following relates to the technical field of vacuum sealer, in particular it relates to a character-printing vacuum sealer and a sealing method using this sealer.

BACKGROUND

Currently, the vacuum sealers evacuate a vacuum packaging bag by using a vacuum pump, and then seal the bag opening through a thermal sealing process. By using the vacuum sealer to store food in vacuum-sealed packaging bag, the vacuum level can be sustained for extended periods, achieving food preservation.

In the prior art, the vacuum sealers generally have printing functions for production dates and batch numbers. Without these functions, users cannot accurately identify the production date and batch number of the food preserved inside the vacuum packaging bags, making it difficult to definitively determine the product expiration or to conduct product traceability.

To address this defect, a printing wheel structure has been developed to print characters on the vacuum packaging bag. However, raised numbers on the printing wheel are needed during the printing process, which increases production costs. Additionally, the printing wheel is prone to damage after extended use, and the cost of changing and servicing procedures is expensive. Moreover, due to the complex structure of the printing wheel used, a large space is required for installation, which increases the overall size of the machine. This contradicts the compact and lightweight design of the current household appliances, failing to meet user demands for user-friendly operation and compact structure.

Therefore, there is an urgent need to develop a multifunctional character-printing vacuum sealer, with a simplified structure, user-friendly operation, a compact and lightweight design, and a large sealing area to thermally print characters.

SUMMARY

To overcome the defects in the prior art, it is an objective of the present disclosure to provide a character-printing vacuum sealer. The character-printing vacuum sealer has advantages as follows: a simplified structure, a compact and lightweight design, user-friendly operation, capability for thermally printing diverse characters with high thermal efficiency, a large sealing area, excellent sealing performance, enhanced stability, and low production costs.

To achieve this purpose, the present disclosure adopts the following technical solutions:

a character-printing vacuum sealer comprising a base and a cover, the cover being movably hinged to a rear edge of the base, the base being configured with a vacuum pump, a control circuit board, and a power cord, wherein the vacuum pump is electrically connected to the control circuit board; an upper vacuum chamber and a lower vacuum chamber, wherein the upper vacuum chamber corresponding to the lower vacuum chamber and form a heat-seal area when the cover is closed against the base, wherein the upper and lower vacuum chambers are each configured with a sealing gasket at their peripheries; a heating sheet assembly electrically connected to the control circuit board being positioned on a front edge of the base opposite to the rear edge; a heat-seal strip being positioned on a front edge of the cover opposite to the rear edge, and configured to cooperate with the heating sheet assembly; wherein, a plurality of character belts and character belt drive arrangements being mounted inside or adjacent to the upper vacuum chamber in the cover and the lower vacuum chambers in the base; several protruding characters being arranged on a surface of each of the character belts; and an elastic character heat-printing mechanism being provided within the base or the cover corresponding to the character belts drive arrangement and configured for thermally printing the protruding characters of the character belt onto a pre-sealed vacuum packaging bag.

In one embodiment, a series of continuous transmission teeth are configured on a back of the character belts, and a plurality of low-stretch, high-tensile fiber ropes are arranged within the character belts along a length direction of the character belts.

In a further embodiment, the character belt drive arrangement comprises a left mounting bracket and a right mounting bracket, as well as multiple sets of character belt adjustment mechanisms, each of which is configured to install different character belts and independently adjust the characters on the corresponding character belts to be thermally printed.

In a further embodiment, each of the character belt adjustment mechanisms comprises a first character belt adjustment mechanism and a second character belt adjustment mechanism. The first character belt adjustment mechanism comprises a first knob, a first gear-toothed sleeve transmission, a first character belt, and a plurality of first bushings for tensioning the first character belt. The first gear-toothed sleeve transmission comprises a first gear installed on the left mounting bracket and two large toothed sleeves installed on a front and rear sides of the right mounting bracket, respectively. The first character belt is wound and tensioned on the first gear, the two large toothed sleeves, and the two first bushings. The first knob and the first gear are fixed on the left mounting bracket, respectively located on the left and right sides of the left mounting bracket and coaxially installed. A plurality of mounting shafts are arranged on the right mounting bracket, with the first bushings sleeved over the mounting shafts.

The second character belt adjustment mechanism comprises a second knob, a second gear-toothed sleeve transmission, a second character belt having protruding characters, and a second bushing. The second gear-toothed sleeve transmission comprises a second gear installed on the left mounting bracket and a small toothed sleeve installed on the right mounting bracket. The second character belt is wound and tensioned on the second gear, the small toothed sleeve, and the second bushing. The second knob and the second gear are installed on the left mounting bracket, respectively located on the left and right sides of the left mounting bracket and coaxially installed. A mounting shaft is arranged on the right mounting bracket, with the second bushing sleeved over the mounting shaft.

In another embodiment, the first character belt and the second character belt are made of elastic, high-temperature-resistant material. Protruding characters are configured on the surface of the first character belt and the second character belt, respectively. In one embodiment, the protruding characters are sequentially arranged various numerals.

In a further embodiment, the protruding characters are a sequentially date numerals arranged from 1 to 31 on the surface of the first character belt, while the protruding characters are a sequentially arranged month numeral from 1 to 12 on the surface of the second character belt.

In one embodiment, the protruding characters may also comprise other numerical forms, such as code numbers, or graphic symbols of patterns, which can be selected according to practical demands.

In a further embodiment, the elastic character heat-printing mechanism comprises an aluminum bracket. The aluminum bracket is sequentially equipped with a character heating sheet for thermally printing characters and a high-temperature-resistant thermoplastic strip coating over the character heating sheet. A left bracket tab and a right bracket tab are disposed on left and right sides of the aluminum bracket, respectively. There are two compression spring chambers symmetrically arranged at a bottom of the aluminum bracket, and each of the compression spring chambers accommodate a compression spring.

In a further embodiment, the heating sheet assembly is directly electrically connected to a terminal of the mains voltage on the control circuit board.

It is another objective of the present disclosure to provide a vacuum sealing method using the above character-printing vacuum sealer. The method comprises the steps as follows:

(1) first, aligning a pre-sealed opening of a vacuum packaging bag with a heat-seal area within a vacuum sealer;
(2) second, locating a position of the vacuum packaging bag to be printed between the character drive arrangement and the elastic character-heat-printing mechanism, and manually rotating knobs to center and upright orient the heat-print characters on the character belts;
(3) finally, closing the cover of the vacuum sealer, activating power supply, and executing simultaneous vacuum sealing and thermal character printing at the heat-seal area.

Compared to the prior art, the present disclosure has the following advantages:

(1) In the present disclosure, the character belts cooperate with the elastic character heat-printing mechanism to perform character thermal printing. As a plurality of characters are configured on the character belts and there are multiple sets of character belts, compared to the traditional character wheel, the character belts can be arranged in an elongated space, making the entire sealer compact. Moreover, the character belts have lower mass compared to the character wheel, thereby reducing the overall sealer weight and enhancing users'daily convenience;
(2) In the present disclosure, the character belts and character belt drive arrangements, as well as the elastic character heat-printing mechanism, can be interchangeably installed within the vacuum chamber on the cover or base of the vacuum sealer, or positioned adjacent to the vacuum chambers. Additionally, the character belts and character belt drive arrangements are integrated, allowing for easy removal without auxiliary tools for servicing or cleaning. This facilitates user-friendly operation and long life-span;
(3) In the present disclosure, using the elastic character heat-printing mechanism with excellent elastic recovery force of the compression spring combined with the sealing rubber gaskets peripherally provided around the upper and lower vacuum chambers ensures that the character belts can better abut against the pre-printed vacuum packaging bag during thermal printing, and can flexibly control the uniform pressure during thermal printing, ensuring a uniform and consistent thermally printing effect for characters;
(4) In the present disclosure, the character belts are long, and multiple sets of numerals, for example date numerals such as 1 to 31 and month numerals such as 1 to 12 can be arranged on the surface of the character belts. The characters can also be others, such as trademarks, graphical patterns, or multilingual text, which can be selected according to practical demands and be widely applied.

BRIEF DESCRIPTION

The present disclosure will be described in detail below with reference to the accompanying drawings and specific embodiments:

DETAILED DESCRIPTION

Figure 1:
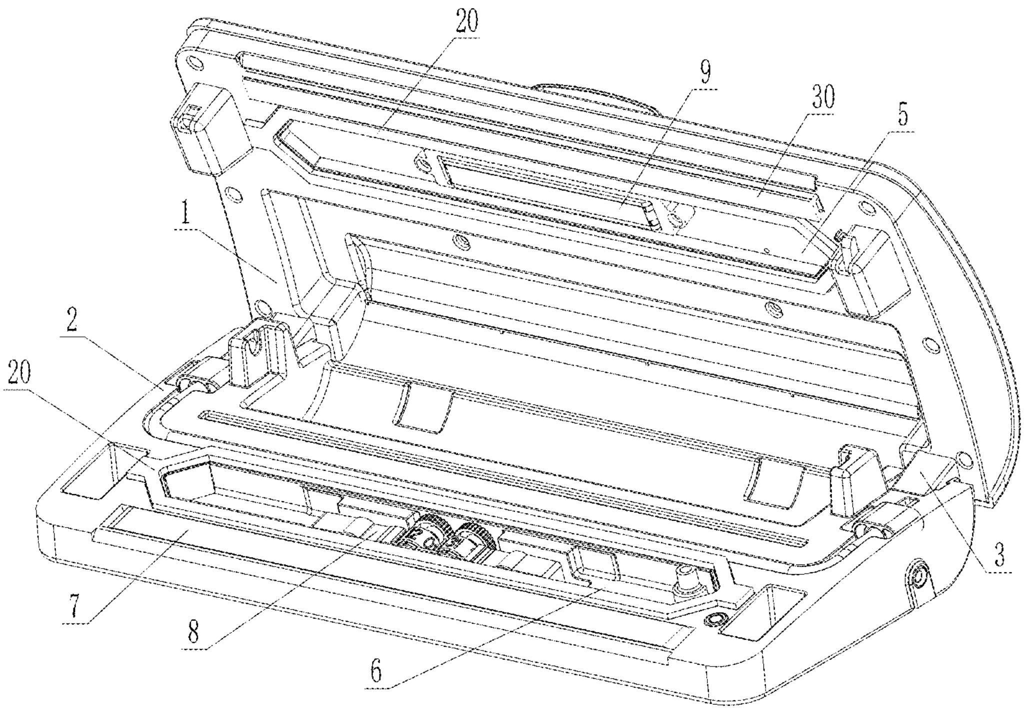
FIG. 1 is a perspective view of the character-printing vacuum sealer in an open state.
Figure 2:
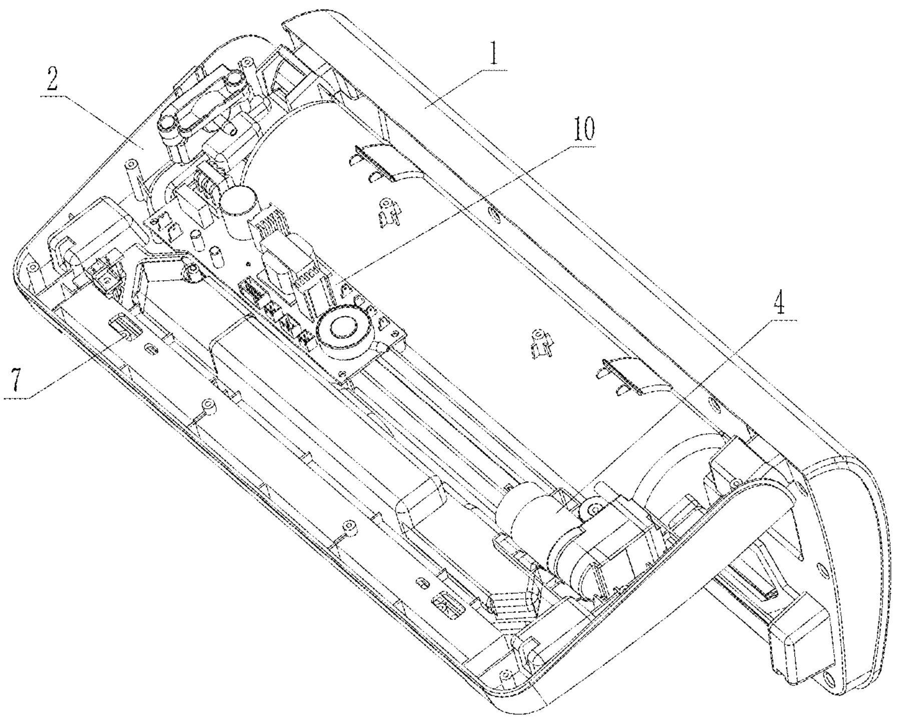
FIG. 2 is a bottom perspective view of the character-printing vacuum sealer to show the bottom of the base.

As shown in FIGS. 1 and 2, the character-printing vacuum sealer comprises a cover 1 and a base 2. The cover 1 is movably hinged to a rear edge of the base 2 by a hinge 3. The base 2 is equipped with a vacuum pump 4, a control circuit board 10, and a power cord, wherein the vacuum pump 4 is electrically connected to the control circuit board 10. An upper vacuum chamber 5 and a lower vacuum chamber 6 are configured to align and form a heat-seal area when cover 1 is closed against the base 2. The upper vacuum chamber 5 and lower vacuum chamber 6 are each configured with a sealing gasket 20 at their peripheries. A heating sheet assembly 7 electrically connected to the control circuit board 10 is positioned on a front edge of the base opposite to the rear edge. A heat-seal strip 30 is positioned on a front edge of the cover opposite to the rear edge and configured to cooperate with the heating sheet assembly 7. Two sets of character belts, such as a first character belt 100 and a second character belt 200, as well as character belt drive mechanisms 8, each of which is configured for respectively independent driving the first character belt 100 and the second character belt 200, are mounted inside the lower vacuum chamber 6 of the base 2. A character elastic heat-printing mechanism 9 is provided inside the upper vacuum chamber 5 within the cover 1 and corresponds to the two sets of character belts, and configured for thermally printing the protruding characters by the character belt drive arrangement 8 onto the pre-sealed vacuum packaging bag.

Figure 3:
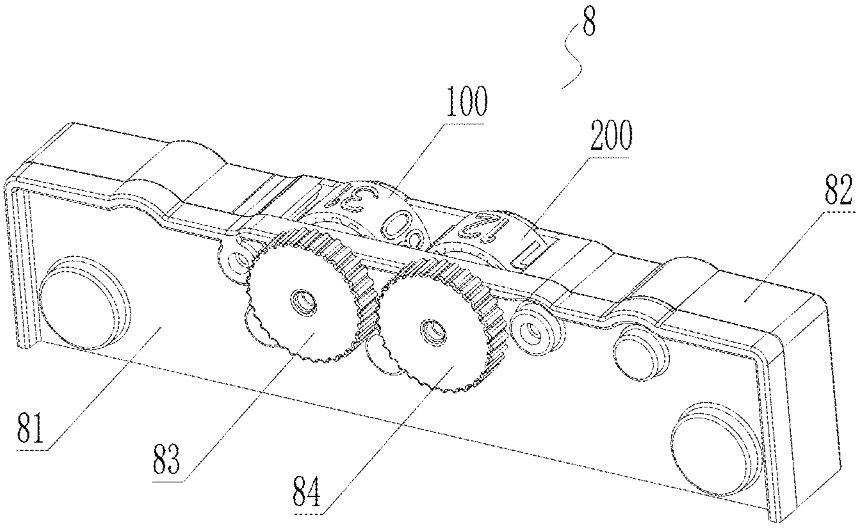
FIG. 3 is a perspective view of the character belt drive arrangement.
Figure 4:
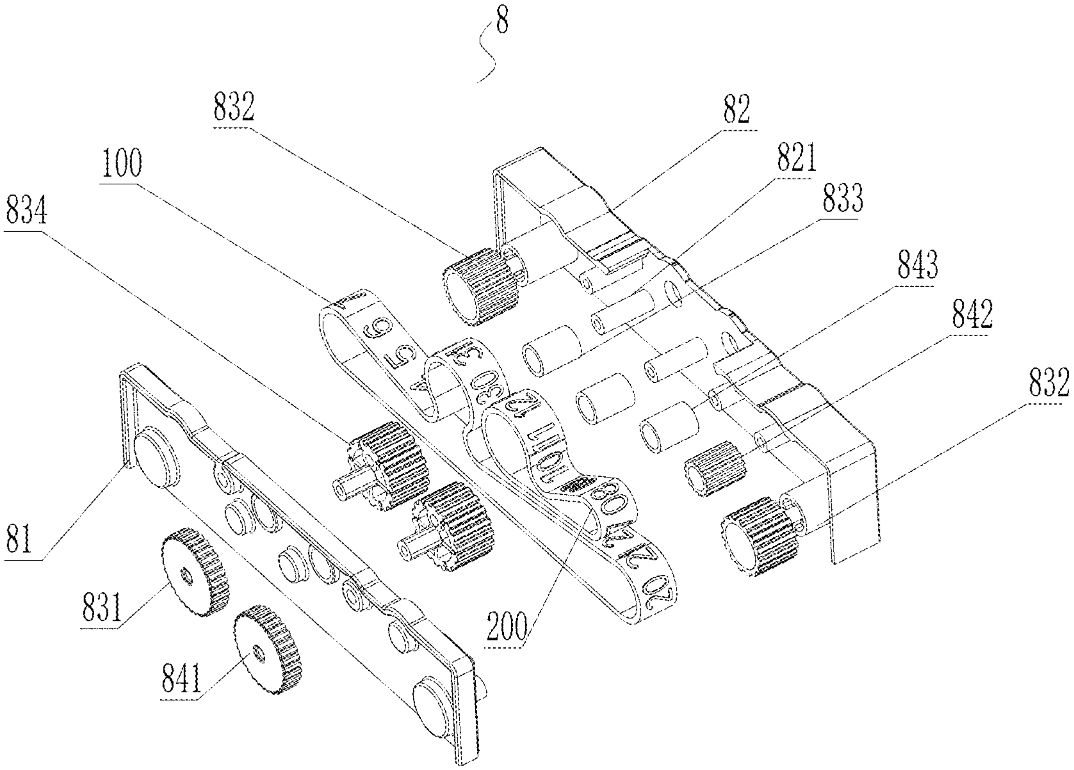
FIG. 4 is an exploded view of FIG. 3.
Figure 5:
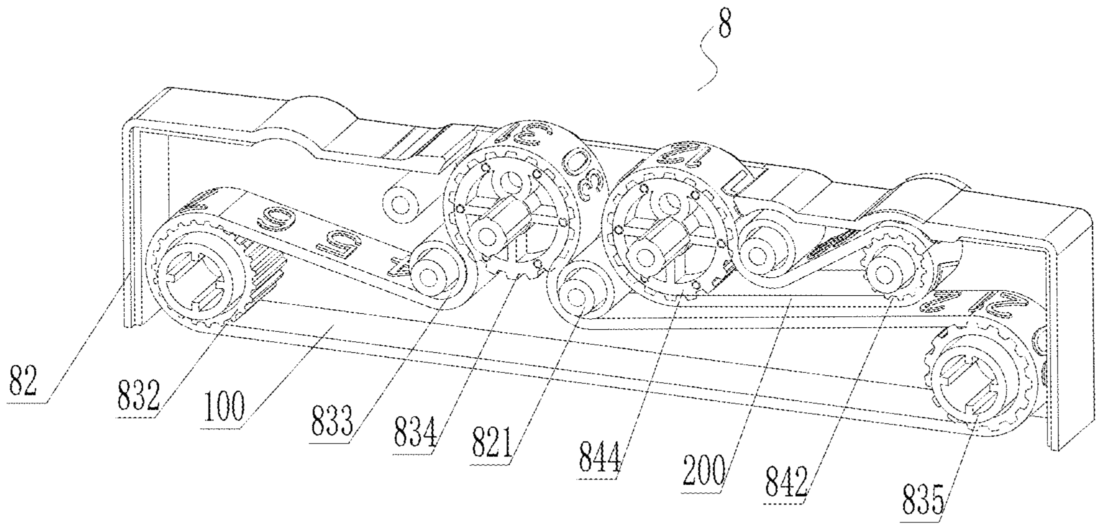
FIG. 5 is another perspective view of the character belt drive arrangement.

As shown in FIGS. 3 to 5, the character belt drive arrangement 8 comprises a left mounting bracket 81 and a right mounting brackets 82, as well as a first character belt adjustment mechanism 83 and a second character belt adjustment mechanism 84. The first character belt adjustment mechanism 83 comprises a first knob 831, a first gear-toothed sleeve transmission, a first character belt 100, and a plurality of first bushings 833. The first gear-toothed sleeve transmission comprises a first gear 834 installed on the left mounting bracket 81 and two large toothed sleeves 832 installed on the front and rear sides of the right mounting bracket 82 respectively. As shown in FIG. 4, the first character belt 100 is wound and tensioned on the first gear 834, the two large toothed sleeves 832, and the two first bushings 833. The first knob 831 and the first gear 834 are fixed on the left mounting bracket 81, respectively located on the left and right sides of the left mounting bracket 81 and coaxially installed. A plurality of mounting shafts 821 are arranged on the right mounting bracket 82, with the first bushings sleeved 833 over the mounting shafts 821.

The second character belt adjustment mechanism 84 comprises a second knob 841, a second gear-toothed sleeve transmission, and a second bushing 843. The second gear-toothed sleeve transmission comprises a second gear 844 installed on the left mounting bracket and a small toothed sleeve 842 installed on the right mounting bracket 82. The second character belt 200 is wound and tensioned on the second gear 843, the small toothed sleeve 842, and the second bushing 843. The second knob 841 and the second gear 844 are installed on the left mounting bracket 81, respectively located on the left and right sides of the left mounting bracket 81 and coaxially installed. A mounting shaft 821 is arranged on the right mounting bracket 843, with the second bushings 843 sleeved over the mounting shaft 821.

Figure 6:
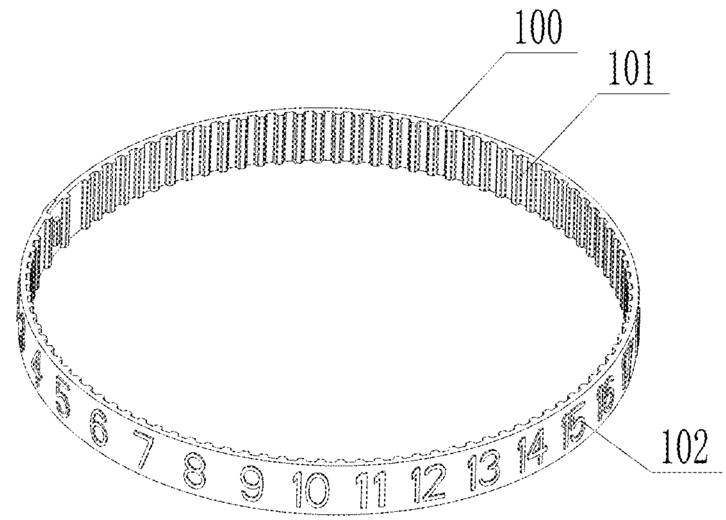
FIG. 6 is a structural diagram of the first character belt.
Figure 7:
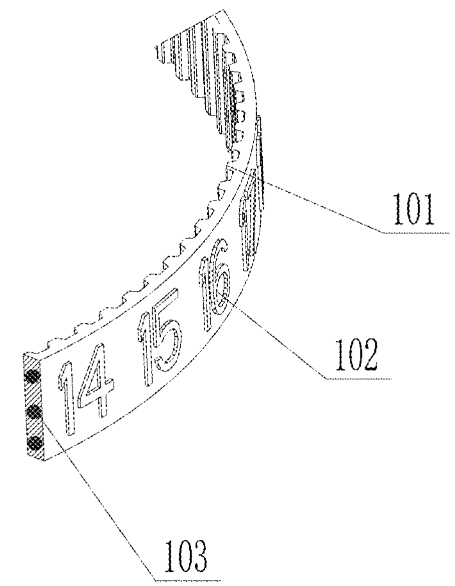
FIG. 7 is a partial sectional perspective view of FIG. 6.
Figure 8:
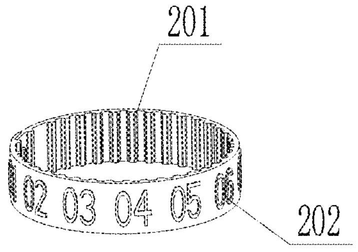
FIG. 8 is a structural diagram of the second character belt.

As shown in FIGS. 6 to 8, a series of continuous transmission teeth 101/201 are configured on the back of the first character belt 100 and the second character belt 200, for transmission via the engagement of the continuous transmission teeth with gears. Additionally, a plurality of low-stretch, high-tensile fiber ropes 103 are arranged within the first character belt 100 along a length direction of the first character belt 100, while a plurality of low-stretch, high-tensile fiber ropes (not shown in the Figure) are arranged within the second character belt 200 along a length direction of the second character belt 200.

In the present disclosure, the first character belt 100 and the second character belt 200 are made of elastic, high-temperature-resistant material. Protruding characters are configured on the surface of the character belts, respectively. In one embodiment, the protruding characters are sequentially arranged various numerals.

In one embodiment, the protruding characters are a sequentially date numerals 102 arranged from 1 to 31 on the surface of the first character belt 100, while the protruding characters are a sequentially arranged month numerals 202 from 1 to 12 on the surface of the second character belt 200.

In the present disclosure, the protruding characters on the character belts are not limited to month and date numerals. They may also comprise other numerical forms, such as code numbers, or graphic symbols of patterns, which can be selected according to practical demands.

Figure 9:
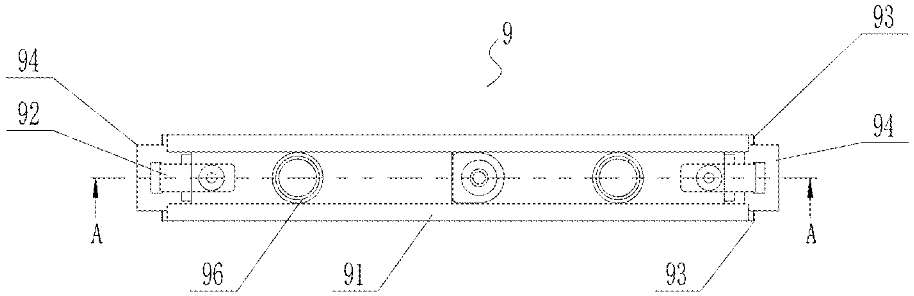
FIG. 9 is a top view of the elastic character heat-printing mechanism.
Figure 10:
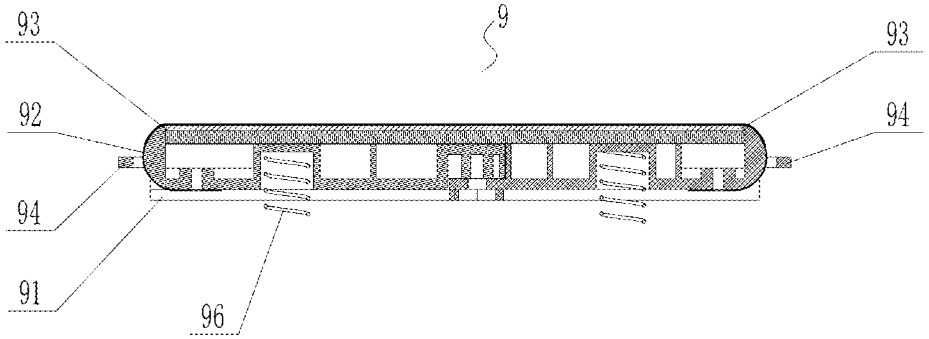
FIG. 10 is a sectional view taken along line A-A of FIG. 9.

As shown in FIGS. 9 and 10, the elastic character heat-printing mechanism 9 comprises an aluminum bracket 91. The aluminum bracket 91 is sequentially equipped with a character heating sheet 92 for thermally printing characters and a high-temperature resistant thermoplastic strip 93 coating over the character heating sheet 92. A left bracket tab and a right bracket tab 94 are disposed on the left and right sides of the aluminum bracket 91, respectively. There are two compression spring chambers 95 symmetrically arranged at a bottom of the aluminum bracket 91, and each of the compression spring chambers 95 accommodate a compression spring 96.

The heating sheet assembly 7 can be selected from commonly used heating sheet components in the industry, as long as they meet the heating and sealing requirements.

The present disclosure also provides a vacuum sealing method using the above character-printing vacuum sealer. The method comprises the steps as follows:

(1) first, aligning a pre-sealed opening of a vacuum packaging bag with the heat-seal area within a vacuum sealer;

(2) second, locating a position of the vacuum packaging bag to be printed between the character drive arrangement and the elastic character-heat-printing mechanism 9, and manually rotating knobs 831/841 to center and upright orient the heat-print characters on the character belts 100, 200;

(3) finally, closing the cover of the vacuum sealer, activating power supply, and executing simultaneous vacuum sealing and thermal character printing at the heat-seal area.

The character-printing vacuum sealer of the present disclosure has the advantages as follows: a simplified structure, a compact and lightweight design, user-friendly and reliable operation, capability for thermally printing diverse characters with high thermal efficiency, tool-free disassembly, facile cleaning and servicing procedures, extended service life, enhanced stability, and low production costs.

The present disclosure is not limited to the embodiments described above. If any modifications and variations made to the present disclosure do not depart from the spirit and scope of the present disclosure, these modifications and variations fall within the protection scope of the claims and legal equivalents, thereby such modifications and variations are encompassed by the claims of the present disclosure.

The invention claimed is:

1. A character-printing vacuum sealer, comprising: a base and a cover, the cover being movably hinged to a rear edge of the base, the base being configured with a vacuum pump, a control circuit board, and a power cord, wherein the vacuum pump is electrically connected to the control circuit board; an upper vacuum chamber and a lower vacuum chamber, wherein the upper vacuum chamber corresponds to the lower vacuum chamber and forms a heat-seal area when the cover is closed against the base, wherein the upper and lower vacuum chambers are each configured with a sealing gasket at their peripheries; a heating sheet assembly electrically connected to the control circuit board and positioned on a front edge of the base opposite to the rear edge; and a heat-seal strip being positioned on a front edge of the cover opposite to the rear edge, and configured to cooperate with the heating sheet assembly, wherein:

a plurality of character belts and a character belt drive arrangement are respectively mounted inside or adjacent to the upper vacuum chamber in the cover and the lower vacuum chamber in the base; several protruding characters are arranged on a surface of each of the character belts; and an elastic character heat-printing mechanism is provided within the base or the cover corresponding to the character belt drive arrangement and configured for thermally printing the protruding characters of the character belts onto a pre-sealed vacuum packaging bag.

2. The character-printing vacuum sealer of claim 1, wherein a series of continuous transmission teeth are configured on a back of the character belts, and a plurality of low-stretch, high-tensile fiber ropes are arranged within the character belts along a length direction of the character belts.

3. The character-printing vacuum sealer of claim 2, wherein the character belt drive arrangement comprises a left mounting bracket, a right mounting bracket, and a plurality of character belt adjustment mechanisms, each of the character belt adjustment mechanisms being configured to install a different corresponding character belt and independently adjust the characters on the corresponding character belt to be thermally printed.

4. The character-printing vacuum sealer of claim 3, wherein: the character belt adjustment mechanisms comprise a first character belt adjustment mechanism and a second character belt adjustment mechanism; the first character belt adjustment mechanism comprises a first knob, a first gear-toothed sleeve transmission, a first character belt, and a plurality of first bushings; the first gear-toothed sleeve transmission comprises a first gear installed on the left mounting bracket and two large toothed sleeves installed on front and rear sides of the right mounting bracket, respectively; the first character belt is wound and tensioned on the first gear, the two large toothed sleeves, and the plurality of first bushings; the first knob and the first gear are fixed on the left mounting bracket, respectively located on left and right sides of the left mounting bracket and coaxially installed; a plurality of mounting shafts are arranged on the right mounting bracket, with the first bushings sleeved over the mounting shafts;

the second character belt adjustment mechanism comprises a second knob, a second gear-toothed sleeve transmission, a second character belt, and a second bushing; the second gear-toothed sleeve transmission comprises a second gear installed on the left mounting bracket and a small toothed sleeve installed on the right mounting bracket; the second character belt is wound and tensioned on the second gear, the small toothed sleeve, and the second bushing; the second knob and the second gear are installed on the left mounting bracket, respectively located on the left and right sides of the left mounting bracket and coaxially installed; and a mounting shaft is arranged on the right mounting bracket, with the second bushing sleeved over the mounting shaft.

5. The character-printing vacuum sealer of claim 4, wherein the first character belt and the second character belt are made of elastic, high-temperature-resistant material and protruding characters are configured on a surface of the first character belt and a surface of the second character belt, respectively.

6. The character-printing vacuum sealer of claim 5, wherein the protruding characters are sequentially arranged various numerals.

7. The character-printing vacuum sealer of claim 5, wherein the protruding characters on the first character belt are sequentially arranged date numerals from 1 to 31 on the surface of the first character belt, while the protruding characters on the second character belt are sequentially arranged month numerals from 1 to 12 on the surface of the second character belt.

8. The character-printing vacuum sealer of claim 1, wherein: the elastic character heat-printing mechanism comprises an aluminum bracket; the aluminum bracket is sequentially equipped with a character heating sheet for thermally printing characters and a high-temperature-resistant thermoplastic strip coating over the character heating sheet; a left bracket tab and a right bracket tab are disposed on left and right sides of the aluminum bracket, respectively; and there are two compression spring chambers symmetrically arranged at a bottom of the aluminum bracket, each of the compression spring chambers accommodating a compression spring.

9. A vacuum sealing method using the character-printing vacuum sealer of claim 1, comprising the following steps:

(1) first, aligning a pre-sealed opening of a vacuum packaging bag with the heat-seal area within the vacuum sealer;

(2) second, locating a position of the vacuum packaging bag to be printed between the character belt drive arrangement and the elastic character heat-printing mechanism, and manually rotating knobs to center and uprightly orient the protruding characters on the character belts; and (3) finally, closing the cover of the vacuum sealer, activating a power supply, and executing simultaneous vacuum sealing and thermal character printing at the heat-seal area.

* * * * *